UNITED STATES PATENT OFFICE.

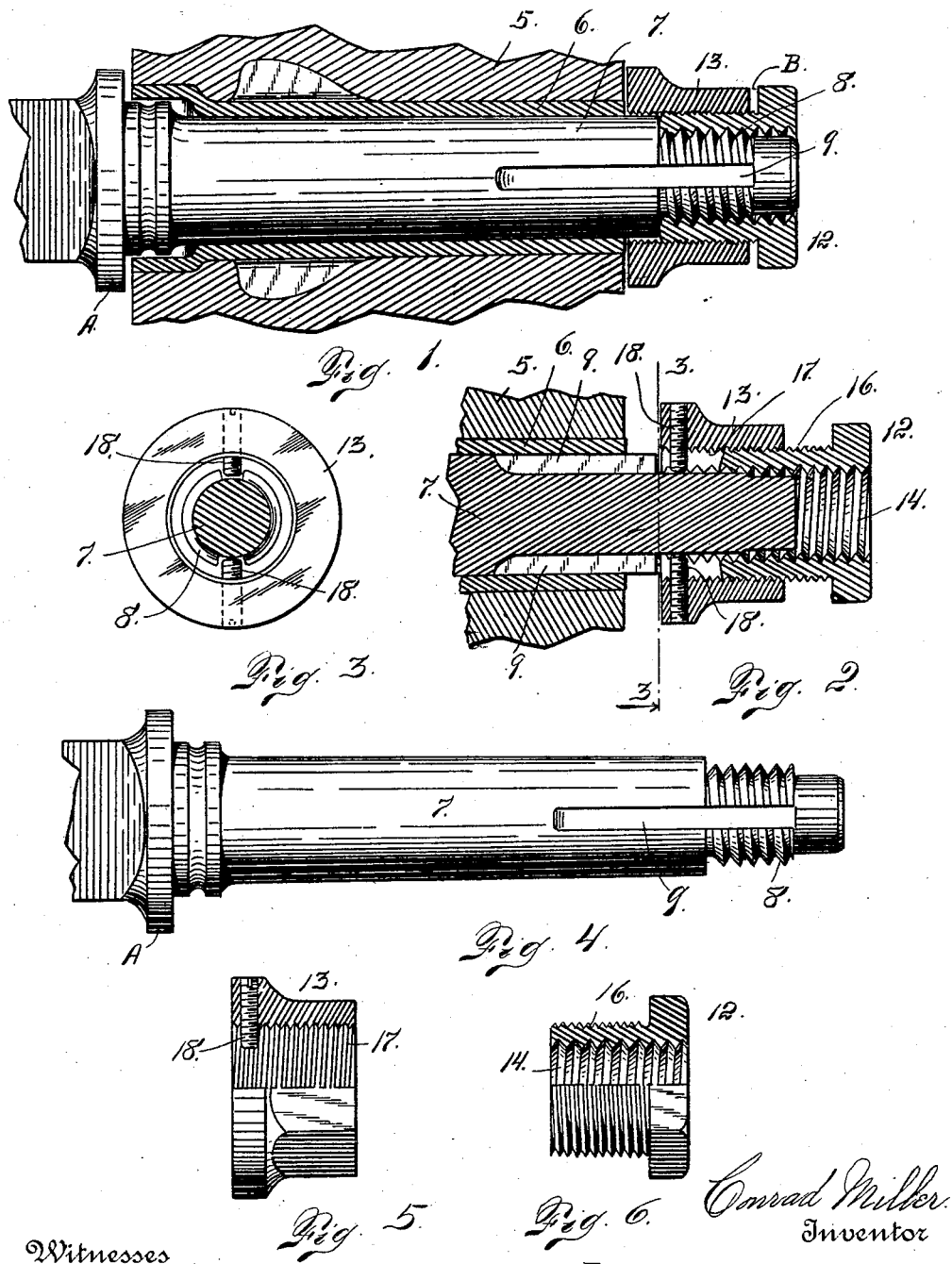

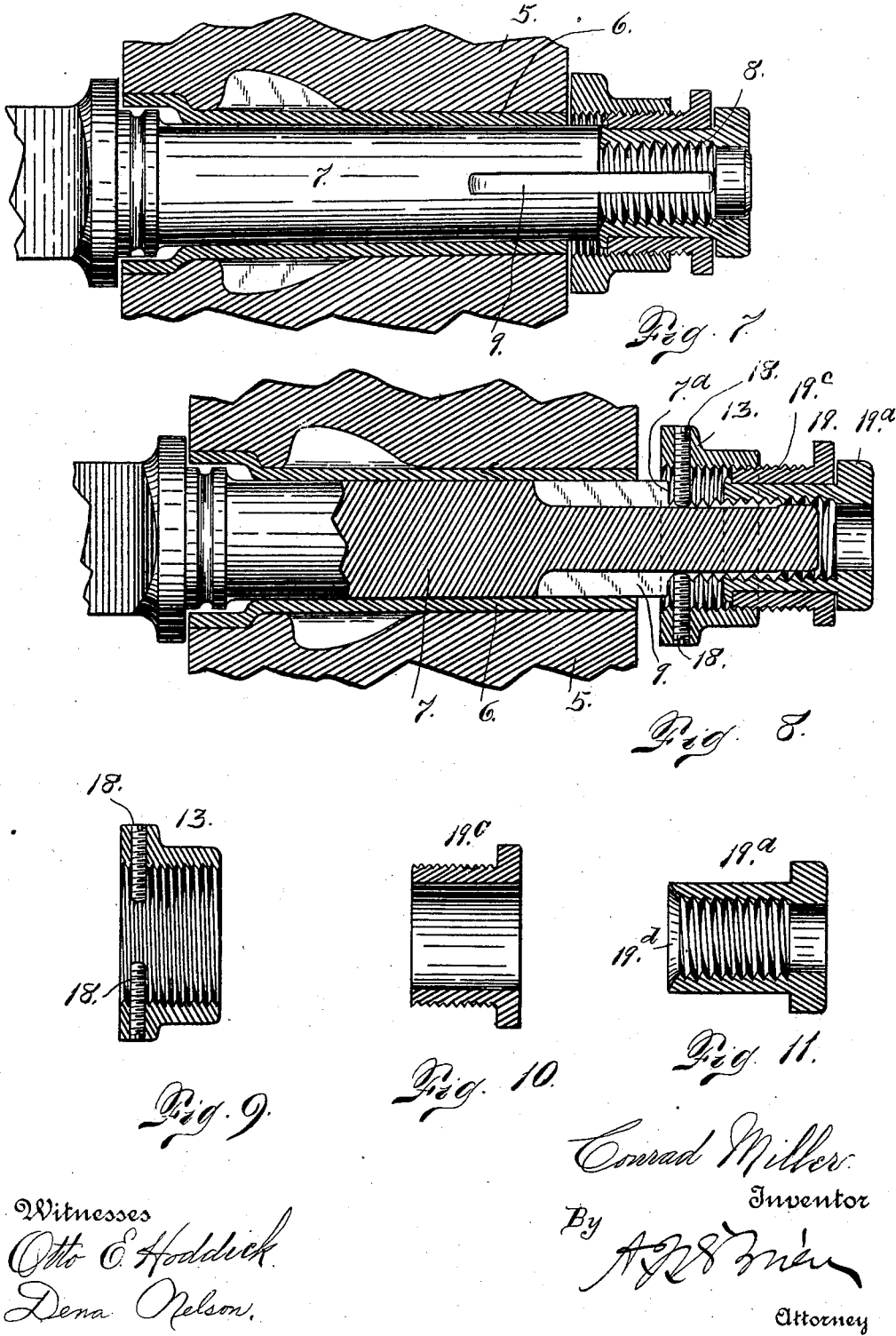

CONRAD MILLER, OF DENVER, COLORADO.

ADJUSTABLE AXLE-NUT.

No. 861,219.　　　Specification of Letters Patent.　　　Patented July 23, 1907.

Application filed September 2, 1905. Serial No. 276,838.

*To all whom it may concern:*

Be it known that I, CONRAD MILLER, a citizen of the United States, residing at the city and county of Denver, and State of Colorado, have invented certain new and useful Improvements in Adjustable Axle-Nuts; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in adjustable axle nuts, my object being to provide a device of this character capable of such adjustment as to take up lost motion incident to the wear between the wheel and axle whereby in the absence of a device of this class the wheel would become loose.

My improved axle nut consists of two members one of which may be termed the nut proper and the other a collar or sleeve interiorly threaded to receive the exterior threads of the nut. The nut is interiorly threaded to engage the threaded extremity of the axle spindle. The threads of the spindle and the interior threads of the nut are preferably of considerably greater pitch than the exterior threads of the nut and the threads of the collar engaged thereby.

The outer extremity of the spindle is grooved, preferably on two opposite sides, to receive interiorly projecting lugs mounted on the collar, whereby the latter member is prevented from turning on the axle incident to the engagement of the hub of the wheel. The axle nut proper of my improved device never comes in contact with the hub of the wheel. Hence the movement of the wheel can have no tendency under any circumstances to unscrew the nut. In my improved construction the nut is capable of considerable range of adjustment within the collar, thus making it practicable to compensate for a considerable degree of lost motion. The interiorly projecting lugs are preferably adjustable and for this purpose consist of screws threaded in the collar and adapted to be unscrewed sufficiently to allow the collar to turn on the end member when applied to the spindle, for adjusting purposes.

Having briefly outlined my improved construction, I will proceed to describe the same in detail reference being made to the accompanying drawing in which is illustrated an embodiment thereof.

In this drawing, Figure 1 is a section taken through my improved axle nut and the hub of the wheel, the journal of the axle being shown in elevation. Fig. 2 is a fragmentary section of the same with the journal also sectionized, the section in this case cutting the adjustable lugs of the collar. Fig. 3 is a section taken on the line 3—3, Fig. 2, viewed in the direction of the arrow. Fig. 4 is a detail elevation of the axle journal. Fig. 5 is a detail view partly in section of the collar member of my improved device. Fig. 6 is a similar view of the nut member of the device. Fig. 7 is a view similar to Fig. 1 but showing a modified form of construction. Fig. 8 is a section taken at right angles to Fig. 7, and showing the members of the axle nut in a different relative position. Fig. 9 is a sectional view of the sleeve member of the nut. Fig. 10 is a section of a bushing which, when the parts are assembled, is journaled on the body of the axle nut. Fig. 11 is a section of the body of the axle nut shown in detail.

The same reference characters indicate the same parts in all the views.

Referring first more especially to Figs. 1 to 6, inclusive, let the numeral 5 designate the hub of the wheel and 6 the bushing of the hub. The spindle 7 is threaded at its outer extremity as shown at 8. This outer extremity of the spindle is also provided with two longitudinal grooves 9 located on opposite sides of the spindle or journal and extending from the threaded end of the journal a suitable distance inwardly.

My improved axle nut consists of the nut member 12 and the collar or sleeve member 13. The member 12 is interiorly threaded as shown at 14 to screw upon the threaded end 8 of the axle journal. This member is also exteriorly threaded as shown at 16 to engage interior threads 17 of the member 13. The threads 16 and 17 are preferably of considerably less pitch than the threads 8 and 14. The member 13 is provided with interiorly projecting lugs 18 preferably adjustable and for this purpose consisting of screws engaging threaded openings formed in the opposite sides of the member. The inner extremities of these lugs are adapted to engage the grooves 9 of the journal whereby when the collar 13 is applied to the journal it is locked against turning thereon.

From the foregoing description the use and operation of this form of my improved device will be readily understood. Assuming that the axle nut is applied to the spindle as shown in Fig. 1, if the space is too great between the nut and the shoulder of the axle against which the hub bears, it is only necessary to unscrew the lugs 18 until their extremities no longer protrude into the grooves 9. In this event the member 13 of the nut may be turned sufficiently on the member 12 to take up the necessary lost motion, whereby the space B between the head of the member 12 and the outer extremity of the member 13 will be increased. As soon as this adjustment is obtained, the threaded lugs 18 are screwed inwardly and made to engage the grooves 9, whereby the member 13 is prevented from turning independently of the axle.

Referring now to Figs. 7 to 11, inclusive, attention is called to the fact that the nut member of the device, which I will designate in its entirety by the numeral 19, is composed of two parts, namely the body member 19ᵃ and an exterior bushing 19ᶜ journaled on the body member, its exterior threads engaging the sleeve member 13, the latter member being substantially the same as in the other form of construction. When the parts 19ᵃ and 19ᶜ are manufactured, part 19ᵃ is in the form shown in Fig. 11. The part 19ᶜ is then slipped over, or upon, the part 19ᵃ, after which the inner extremity 19ᵈ of the part 19ᵃ is upset to form a shoulder which holds the bushing in place on the body part 19ᵃ. The arrangement, however, is such that the bushing is allowed to turn freely on the body member. After the parts 19ᵃ and 19ᶜ are assembled, as just described, to form the nut member, the sleeve member 13 is screwed upon the exterior threads of the bushing a suitable distance. The entire device then being assembled is applied to the threaded end of the spindle, the body part of the nut being screwed thereon. When the device is properly adjusted, the inner extremity of the part 19ᵃ should engage the shoulder 7ᵃ of the spindle. In case the sleeve member 13 engages the hub 5 before the part 19ᵃ is moved to its inward limit, the bushing 19ᶜ may be turned toward the right, whereby the sleeve member 13 will be moved outwardly from the hub. This operation is continued until the sleeve 13 is a sufficient distance from the hub to allow the part 19ᵃ to be screwed home as just described.

After the device is properly adjusted, as shown in Fig. 7, as the hub becomes worn and the space between its outer extremity and that of the sleeve 13 increases, resulting in too much lost motion, it is only necessary to turn the bushing 19ᶜ toward the left, whereby the sleeve 13 is caused to travel toward the outer extremity of the hub, until the space between it and the hub is reduced to the proper limit. It will thus be seen that through the instrumentality of the bushing part 19ᶜ of the nut member, the adjustment of the device may be quickly and easily accomplished.

Having thus described my invention, what I claim is:

1. The combination of a spindle, an axle nut composed of two members, the first being interiorly threaded and the second being exteriorly threaded to correspond, the exteriorly threaded member having a threaded spindle-receiving socket, the spindle and the first member having adjustable interlocking features to prevent the one from turning independently of the other.

2. The combination of a spindle, of an axle nut composed of two members, the first being interiorly threaded and the second exteriorly threaded to correspond, the exteriorly threaded member having a threaded spindle receiving-socket, the spindle having a groove and the first member having an adjustable lug adapted to enter the groove for the purpose set forth.

3. An axle nut composed of two members, the first member being interiorly threaded and having an adjustable interiorly projecting lug, the second member being exteriorly threaded to fit the interior threads of the first member, the second member also having a threaded socket whose threads are of greater pitch than the exterior threads of the said member.

4. The combination of an axle whose outer extremity is threaded, a nut having a threaded socket adapted to engage the threaded extremity of the spindle, the threads of the two parts being of the same pitch, the said nut having exterior threads of less pitch, and a collar interiorly threaded to correspond with the exterior threads of the nut, the nut and collar being constructed to coöperate, the collar occupying a position between the shouldered head of the nut and the hub of the spindle, the collar and spindle having adjustable interlocking features to prevent the one from turning upon the other.

5. The combination of a spindle having an outer threaded extremity and a recess located near the threaded extremity, a collar having an adjustable lug adapted to enter said recess whereby the collar is prevented from turning on the spindle, the collar being interiorly threaded, and a nut exteriorly threaded to engage the interior threads of the collar, the said nut having a threaded socket adapted to receive the threaded extremity of the spindle, the threads of the said socket and the spindle being of greater pitch than the interlocking threads of the nut and collar.

6. The combination of a spindle having an outer threaded extremity and recesses formed in the spindle near its threaded extremity, a collar having adjustable lugs adapted to engage the recesses of the spindle, said collar being interiorly threaded, and a nut proper having exterior threads engaging the interior threads of the collar, and a threaded socket adapted to engage the threaded extremity of the spindle, the threads of the nut and spindle being of greater pitch than the interlocking threads of the nut and collar for the purpose set forth.

In testimony whereof I affix my signature in presence of two witnesses.

CONRAD MILLER.

Witnesses:
  DENA NELSON,
  P. J. EDWIN ROBINSON.